United States Patent [19]
Butler et al.

[11] Patent Number: 5,905,609
[45] Date of Patent: May 18, 1999

[54] MAGNETIC DISK DRIVE HAVING A VCM PLATE WHICH INCLUDES AN ELONGATED PROTRUSION FOR SECURING A FLEX CLAMP TO THE BASE

[75] Inventors: Walter W. Butler, Felton; Payman Hassibi, San Jose; Tami Ogle, Santa Clara, all of Calif.

[73] Assignee: Western Digital Corporation, Irvine, Calif.

[21] Appl. No.: 08/971,153

[22] Filed: Nov. 14, 1997

[51] Int. Cl.⁶ .............................. G11B 5/55; G11B 21/08
[52] U.S. Cl. .............................................................. 360/106
[58] Field of Search ..................... 360/106, 97.01–97.04, 360/98.01

[56] References Cited

U.S. PATENT DOCUMENTS

| 5,337,202 | 8/1994 | Jabbari et al. | 360/106 X |
|---|---|---|---|
| 5,579,190 | 11/1996 | Mastache et al. | 360/106 |
| 5,655,285 | 8/1997 | Bonn et al. | 360/106 X |
| 5,680,277 | 10/1997 | Bonn et al. | 360/106 |
| 5,726,835 | 3/1998 | Scanlon et al. | 360/106 |
| 5,734,528 | 3/1998 | Jabbari et al. | 360/106 |

*Primary Examiner*—John H. Wolff
*Attorney, Agent, or Firm*—Leo Young; W. Chris Kim; Milad Shara

[57] ABSTRACT

A magnetic disk drive includes a base which supports a head stack assembly having a coil portion, a flex circuit cable having a grounding portion, and a flex clamp and in which a voice coil motor (VCM) is formed from the coil portion's interaction with upper and lower VCM plates that carry at least one permanent magnet. The disk drive includes a Z-shaped grounding portion which wraps around one end of the flex clamp and permits a single screw to secure that end of the flex clamp to the base and simultaneously make grounding contact with the grounding portion and an elongated protrusion extending from one of the VCM plates that is adjacent to the flex clamp to hold that end of the flex clamp against the base when the VCM plates are fastened to the base.

4 Claims, 5 Drawing Sheets

MAGNETIC DISK DRIVE HAVING A VCM PLATE WHICH INCLUDES AN ELONGATED PROTRUSION FOR SECURING A FLEX CLAMP TO THE BASE

CROSS-REFERENCES TO RELATED APPLICATIONS

This application is related to a co-pending U.S. application, Ser. No. 08/970,578, filed Nov. 14, 1997, and entitled "Magnetic Disk Drive Having a Z-Shaped Grounding Portion in the Flex Circuit Cable."

BACKGROUND OF THE INVENTION

1. Field of the Invention

The present invention relates to a disk drive and more particularly to a magnetic disk drive having a flex clamp with an integrated VCM plate connection, a single-sided flex circuit cable having a Z-shaped grounding portion, or both.

2. Description of the Prior Art and Related Information

A typical hard disk drive includes a head disk assembly (HDA) and a printed circuit board assembly (PCBA). The HDA includes an enclosure having a base and cover, at least one magnetic disk (disk), a spindle motor for rotating the disk, and a head stack assembly (HSA) that includes a transducer head (head) for reading and writing data.

The HSA is controllably positioned by a servo system in order to read or write information from or to particular tracks on the disk. The typical HSA includes:(1) an actuator assembly that moves in response to the servo control system; (2) a head gimbal assembly (HGA) that extends from the actuator assembly and biases the head towards the disk; (3) a flex circuit cable for carrying read/write signals and a ground line to and from the head; (4) a "flex clamp" for clamping a connector end of the flex circuit cable to a connector port on the base; and (5) a ground connection to the base at the connector end of the flex circuit cable.

As to the actuator assembly, the industry presently prefers a "rotary" or "swing-type" actuator assembly which conventionally comprises an actuator body that rotates on a pivot assembly between limited positions, a coil portion that extends from one side of the actuator body and interacts with one or more permanent magnets held by "VCM plates" to form a voice coil motor, and an actuator arm that extends from an opposite side of the actuator body to support the HGA.

As to the HGA, a typical HGA includes a load beam, a gimbal, and a head or slider. The load beam has a spring function which provides a "gram load" biasing force and a hinge function which permits the head to follow the surface contour of the spinning disk. The load beam has an actuator end that connects to the actuator arm and a gimbal end that connects to the gimbal which carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

With reference to FIG. 1, a prior art magnetic hard disk drive, a portion of which is shown, requires five screws 801–805 and five corresponding threaded holes 841–845 in the base 840 to attach voice coil motor (VCM) plates 850 and 860, a flex circuit cable 830, and a flex clamp 820 to the base. Two screws 802, 803 secure the VCM plates 850, 860 to the base 840 via corresponding aperture pairs (852;862), (853;863), and threaded holes 842, 843. The lower VCM plate 860 includes a permanent magnet 864. Two screws 801, 804 secure the flex clamp 820 and flex circuit cable 830 to the base 840 via corresponding aperture pairs (821;831), (824;834) and threaded holes 841, 844. One individual screw 805 connects a metal grounding contact 837 of the flex circuit cable 830 to the base 840 via an aperture 835 and threaded hole 845.

However, using screws presents some potential drawbacks such as:

the cost of the screws;

the time and cost required for positioning and driving the screws;

the time and cost of forming threaded screw holes in the base to receive the screws;

the environmental leak paths that may be caused by the screw holes in the base; and the particulate contamination that may be generated by fastening each screw to a corresponding screw hole.

Accordingly, there is a need for a magnetic disk drive that reduces the number of screws needed to secure the VCM plates, flex clamp, and flex circuit cable including the ground connection to the base.

SUMMARY OF THE INVENTION

The present invention can also be regarded as a magnetic disk drive including a base, a magnetic storage disk, means for rotating the disk, and a head stack assembly coupled to the base. The head stack assembly includes an actuator body having a mounting site, a coil portion cantilevered from the actuator body, and an actuator arm cantilevered from the actuator body in an opposite direction from the arm. The head stack assembly further include a flex circuit cable having an actuator body end and an electrical connector end, the body end mounted to the mounting site and a flex clamp for clamping the electrical connector end of the flex circuit cable to the base; the clamp has first and second ends. The disk drive further includes means for securing the first end of the clamp to the base and an upper voice coil motor plate and a lower voice coil motor plate. The plates are secured to the base and one of the plates has an elongated protrusion extending from the plate for contacting and securing the second end of the clamp to the base.

DETAILED DESCRIPTION OF THE PREFERRED EMBODIMENTS

Figure 2:
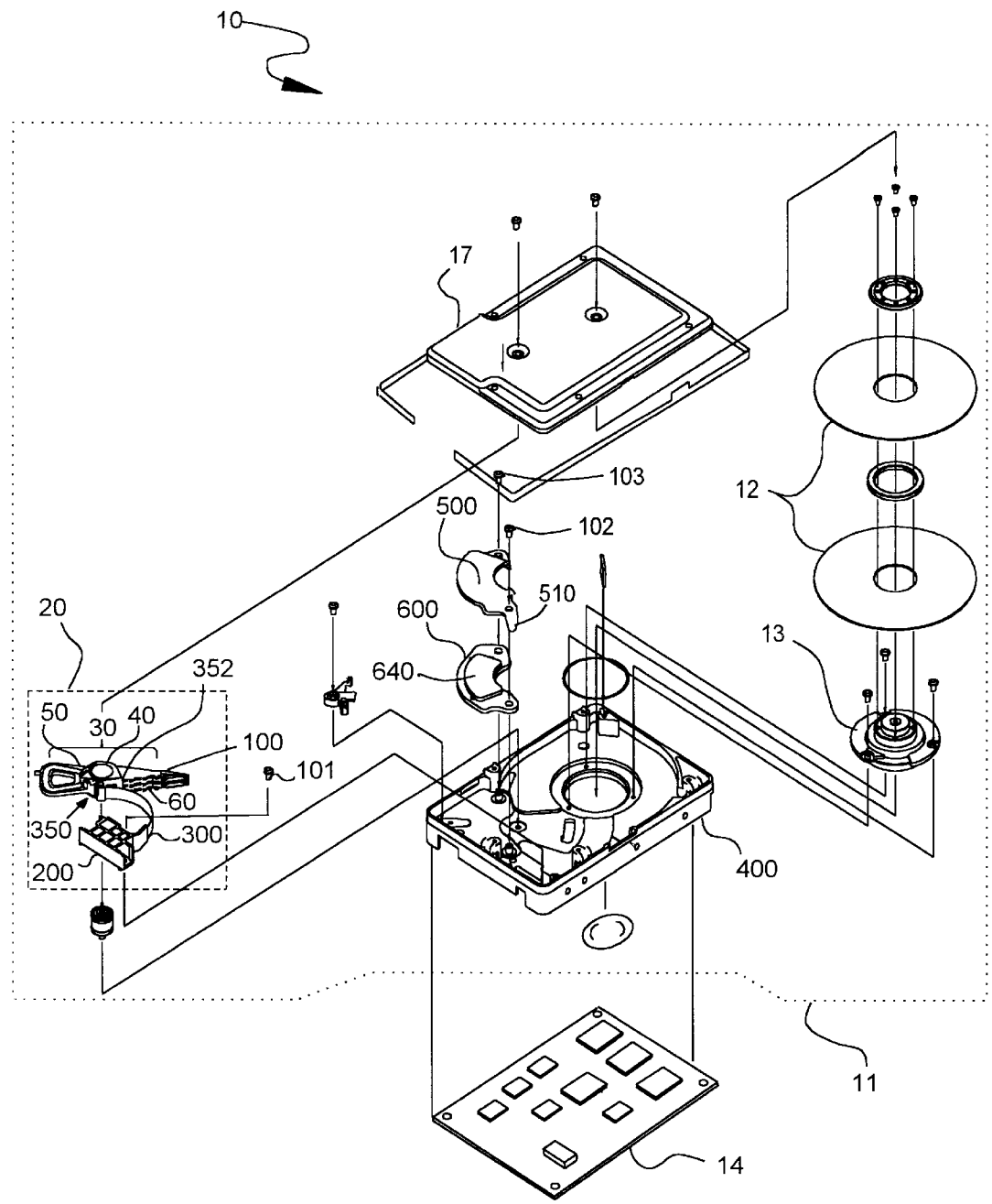
FIG. 2 is an exploded perspective view of a magnetic hard disk drive according to the present invention wherein only three screws are needed to secure the VCM plates, the flex clamp, and the grounding contact to the base.
Figure 3:
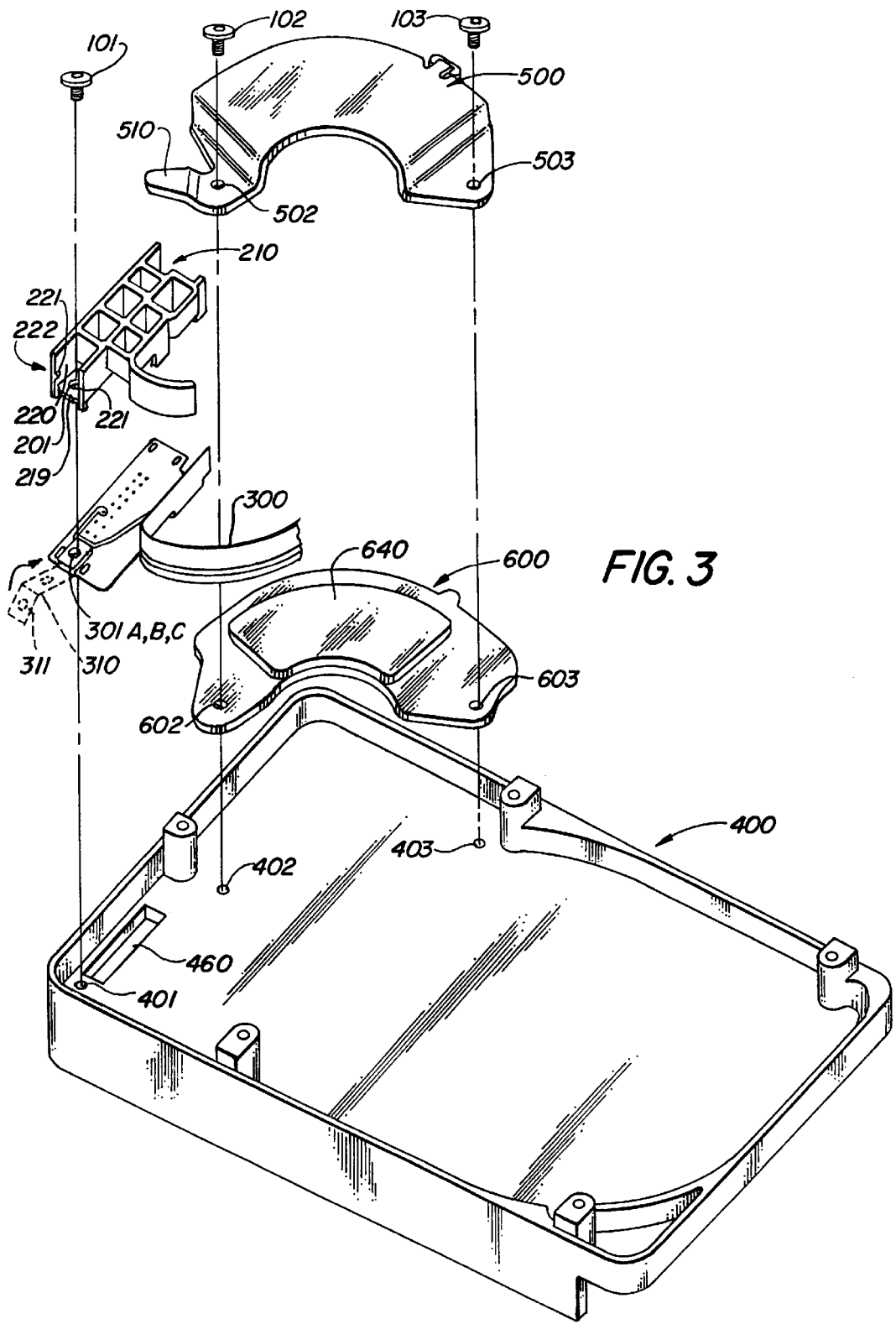
FIG. 3 is a partial exploded perspective view of the disk drive of FIG. 2 emphasizing the connection of the VCM plates, the flex clamp, and the grounding contact to the base.

FIGS. 2 and 3 show the principal components of a disk drive such as a magnetic hard disk drive 10 constructed in accordance with the present invention. As shown in FIG. 2, disk drive 10 includes a head disk assembly (HDA) 11 and a printed circuit board assembly (PCBA) 14.

The HDA 11 includes a base 400 and a cover 17 that collectively house a magnetic disk 12 (two disks are shown), a means for rotating disk 12 such as a spindle motor 13 (preferably, at a constant angular velocity), and a head stack assembly 20. The head stack assembly 20 includes a swing-type or rotary actuator assembly 30, at least one head gimbal assembly 100, and a flex cable assembly which includes a flex circuit cable 300 and a flex clamp 200. The flex circuit cable 300 has an actuator body end 350 that is mounted to a mounting site 352 on a side of the actuator body 40 and an electrical connector end 330 that carries a connector (not shown) that protrudes through a connector port 460 in the base 400 and connects to a corresponding connector (not shown) on the PCBA 14. The connector end 330 of the flex circuit cable 300 is clamped to the base 400 by the flex clamp 200.

The actuator assembly 30 includes a coil portion 50, an actuator body 40, and an actuator arm 60. The coil portion 50 is movably positioned between an upper VCM plate 500 and a lower VCM plate 600. The VCM plates carry at least permanent magnet, e.g. 640, that creates a magnetic field which causes the coil portion 50 (and attached actuator arm 60) to move arcuately in response to current flowing through a coil in the coil portion 50.

Figure 4:
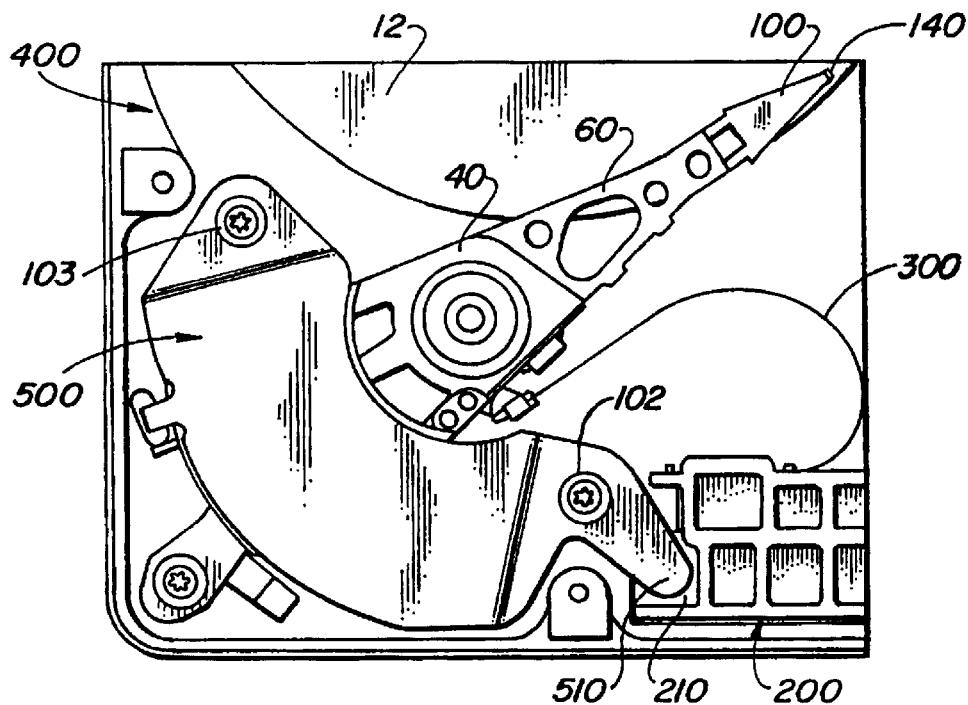
FIG. 4 is a partial plan view of the disk drive of FIG. 2 (assembled) showing how a first screw may be eliminated by extending one end of a VCM plate to hold an adjacent end of the flex clamp to the base.
Figure 5:
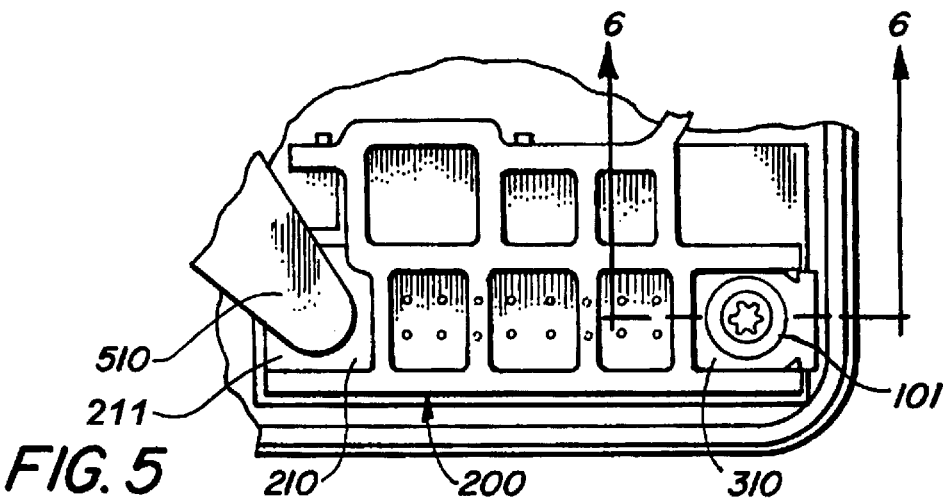
FIG. 5 is a partial plan view of the disk drive of FIG. 2 (assembled) showing how a second screw may be eliminated by providing a grounding portion on the flex circuit cable which is contacted by the same screw that secures an adjacent end of the flex clamp to the base.

As shown more clearly in FIG. 4, the actuator arm 60 supports the head gimbal assembly 100 with a transducer head 140 located at its far end. The head stack assembly 20 is located within the HDA 10 such that the head 140 of the head gimbal assembly 100 is biased towards and moveable over the disk 12. The HDA's storage capacity may be increased, as shown in FIG. 2, by including several disks 12 and a head stack assembly 20 having a vertical "stack" of head gimbal assemblies 100 and associated heads 140 for each surface of each disk 12, the head gimbal assemblies 100 supported by multiple actuator arms 60.

Figure 1:
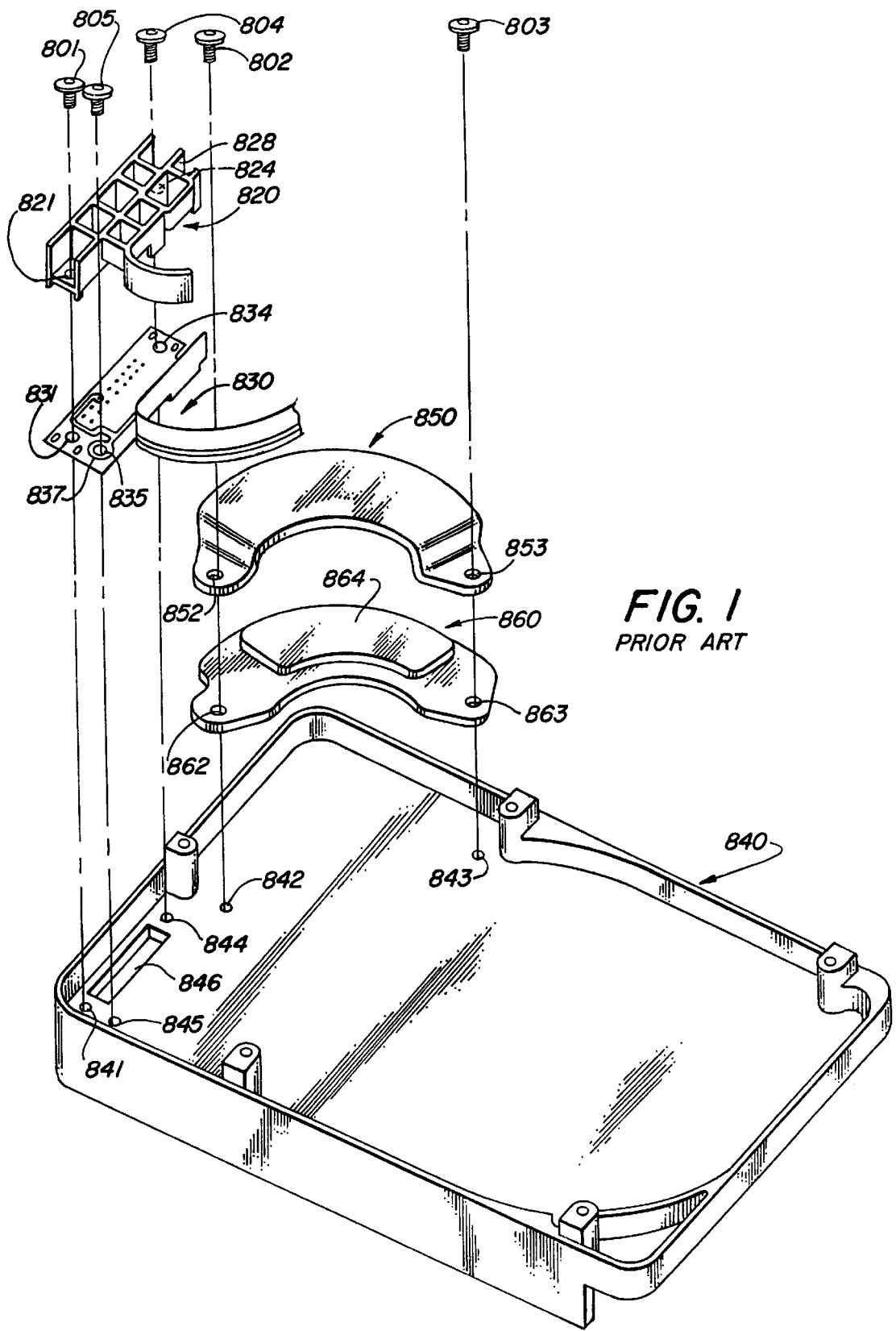
FIG. 1 is a partial exploded perspective view of a prior art magnetic hard disk drive in which five screws are used to secure the VCM plates, the flex clamp, and the grounding contact to the base.

With reference to FIG. 3, the present invention eliminates the need for two screws 804, 805 and two corresponding screw holes 844, 845 as shown in prior art FIG. 1.

The first screw 804 and hole 844 are eliminated by modifying one of the two VCM plates 500, 600 so that it includes a substantially U-shaped elongated protrusion 510 that contacts and secures a second end 210 having a plate contact surface 211 of the flex clamp 200 to the base when the VCM plates 500, 600 are secured to the base by the screws 102, 103 via corresponding aperture pairs (502;602), (503;603) and threaded holes 402,403. FIG. 4 most clearly shows how the protrusion 510 presses down on the second end 210 of the flex clamp 200. The second end 210 of the flex clamp 200 is modified to accommodate the protrusion 510. The primary difference between the second end 210 of the preferred flex clamp 200 and the corresponding end of the existing flex clamp 820 (see FIG. 1) is the absence of an end wall 828 that permits the protrusion 510 to contact a bottom portion (not separately numbered) of the flex clamp 200.

The second screw 805 and hole 845 are eliminated in accordance with the present invention by providing a unique grounding portion 310. As shown in FIG. 3, the flex clamp 200 includes a first end 222 with a means for defining a clamp hole such as a cylindrical clamp hole 201. Clamp hole 201 receives means, such as a screw 101, for securing first end 222 of clamp 200 to the base 400 via corresponding holes in grounding portion 310 and a threaded hole 401. Alternatively, the clamp hole defining means may comprise a U-shaped end aperture, or any other suitable arrangement. In any event, the grounding portion 310 is designed to receive an electrically conductive fastener such as screw 101 in alignment with the clamp hole 201.

As shown by the dashed lines in FIG. 3, the preferred grounding portion 310 folds back over the first end 222 of the flex clamp and presents an upward facing conductive ground contact 311 to the screw 101 used to secure the first end 222 of the flex clamp 200 and flex circuit cable 300 to the base 400. Suitably, ground contact may be a metal such as gold. In contrast to this arrangement, the prior art disk drive of FIG. 1 required a separate screw 805 and threaded hole 845 for engaging a conductive ground contact 837 surrounding a corresponding hole 835 in the flex circuit cable 830.

Figure 6:
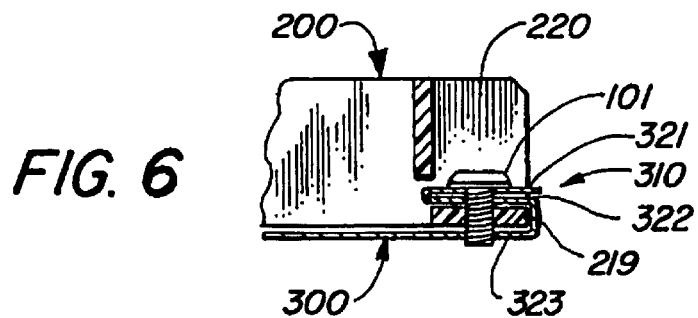
FIG. 6 is a partial cross-sectional view of FIG. 5 taken along section lines 6—6 showing a preferred embodiment of the grounding portion having a "Z-shaped" arrangement that permits a ground connection to an upper side of a single sided flex circuit cable.
Figure 7:
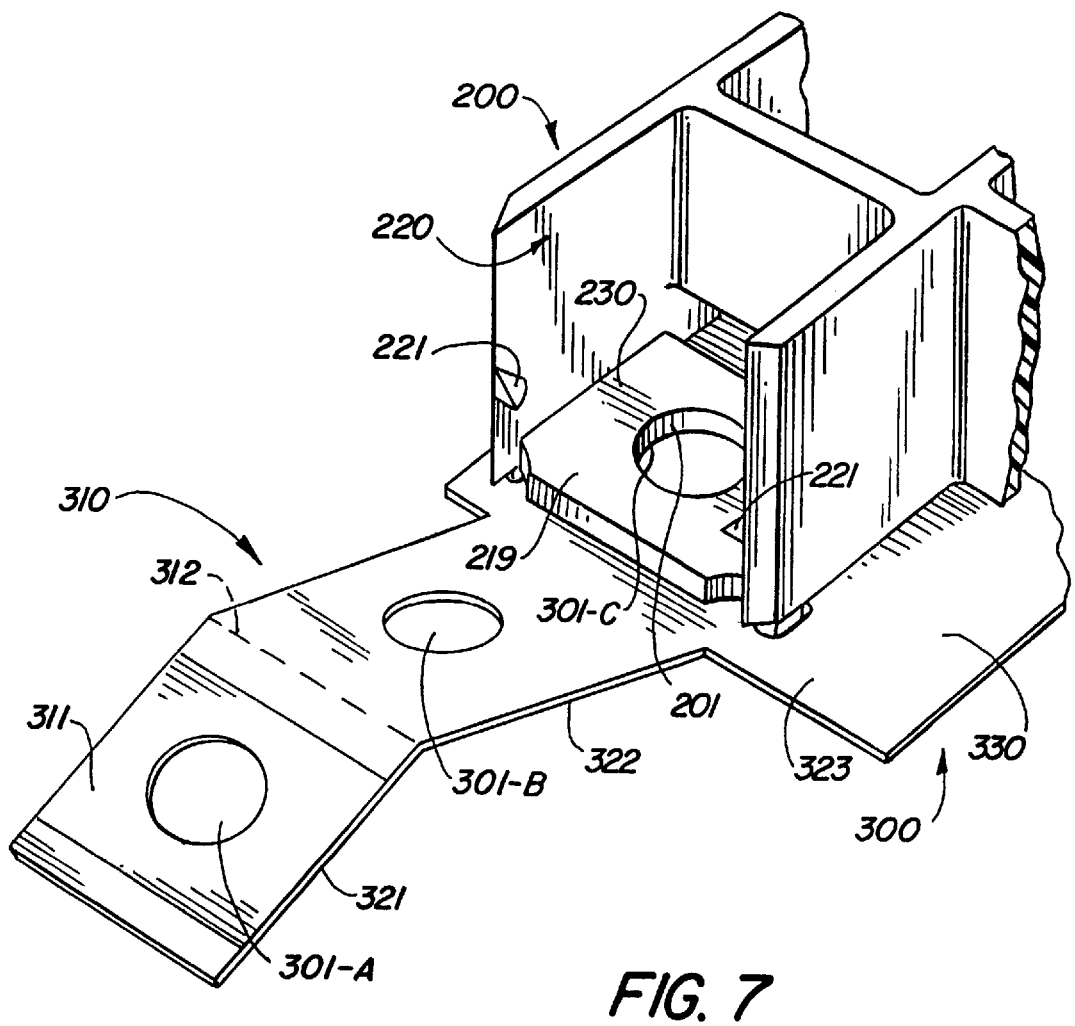
FIG. 7 is an enlarged partial perspective view showing the interface between preferred grounding portion of FIG. 6 and the preferred flex clamp.

The flex circuit cable 300 may be formed with conductive traces on one or both sides but is preferably formed with traces only on the top side in order to minimize cost. FIGS. 6 and 7 show a preferred double segment grounding portion 310 that can be folded over the flex clamp 200 in such a way that ground contact 311 formed on the top stays on the top and thereby makes good electrical contact with the screw 101. As best shown in FIGS. 6 and 7, the preferred grounding portion 310 comprises a top layer 321 having conductive ground contact 311 for grounding the flex circuit cable 300 to the base 400, a bottom layer 323 below the top layer 322, and a middle layer 322 between the top layer 321 and the bottom layer 323. Each layer 321, 322, 323 has a hole 301-A, 301-B, 301-C, respectively, that in combination with clamp hole 201 define a common center axis in the longitudinal direction for receiving the screw 101 when the grounding portion 310 is folded over the flex clamp 200 (Z-Shaped). Also, between the top and middle layers is a portion 312 which represents the point at which top layer 321 folds relative to middle layer 322.

The preferred embodiment was directed to a single side flex circuit cable 300. If the conductive traces were formed on both the top and on the bottom of the flex circuit cable 300, then a "single segment" grounding portion 310 (not shown) may simply be folded around the end 220 of the flex clamp 200 so a that grounding conductor exposed on the back side of the top layer is presented upward, and so that an aperture carried by the top layer of the grounding portion 310 aligns with an aperture carried by the bottom layer of the grounding portion 310 and with the clamp hole 201 in the flex clamp 200.

The preferred flex clamp 200, as best shown in FIG. 7, includes a means such as a pair of opposed detents 221 for retaining the top and middle layers 321, 322 of the grounding portion 310 in position between the vertical walls 220 (not separately numbered) to simplify the positioning of the top and middle layers prior to inserting the screw 101.

Opposed detents 221 extend inwardly from the vertical walls 220 above a top surface 230 of the base portion 219. The top and middle layers of the grounding portion 310 are simply slipped between the base portion 219 and detents 221, prior to installation of the screw 101.

Significantly, by providing an upper voice coil motor plate having an elongated protrusion in combination with a Z-Shaped grounding portion in the flex circuit cable and a flex clamp, several screws and associated screw holes are eliminated in a disk drive. As a result, the cost and assembly time of disk drives are reduced, the number of environmental leak paths via screw holes are reduced and a reduction in particulate contamination occurs since fewer screws are fastened to corresponding screw holes.

We claim:

1. A magnetic disk drive comprising:
   a base;
   a magnetic storage disk;
   means for rotating the disk,
   a head stack assembly coupled to the base, the head stack assembly comprising:
      an actuator body having a mounting site,
      a coil portion cantilevered from the actuator body;
      an actuator arm cantilevered from the actuator body in an opposite direction from the arm;
      a flex circuit cable having an actuator body end and an electrical connector end, the body end mounted to the mounting site;
   a flex clamp for clamping the electrical connector end of the flex circuit cable to the base, the clamp having first and second ends, the second end defining a plate contact surface;
   means for securing the first end of the clamp to the base;
   an upper voice coil motor plate and a lower voice coil motor plate, one of the plates having an elongated protrusion extending from the plate, and
   plate securing means for securing the voice coil motor plates to the base such that the elongated protrusion contacts the plate contact surface to secure the second end of the clamp to the base.

2. The magnetic disk drive of claim 1 wherein the voice coil motor plate having the protrusion is the upper voice coil motor plate.

3. The magnetic disk drive of claim 1 wherein the means for securing the first end of the clamp to the base comprises a clamp hole at the first end of the clamp for receiving a fastener which extends through the clamp hole to the base.

4. The magnetic disk drive of claim 1 wherein the protrusion is a substantially U-shaped protrusion.

* * * * *